(12) United States Patent
Tiwari et al.

(10) Patent No.: US 10,931,115 B1
(45) Date of Patent: Feb. 23, 2021

(54) ELECTRICAL POWER SYSTEMS HAVING A CLUSTER TRANSFORMER WITH MULTIPLE PRIMARY WINDINGS

(71) Applicant: General Electric Company, Schenectady, NY (US)

(72) Inventors: Arvind Kumar Tiwari, Bangalore (IN); Rajni Kant Burra, Clifton Park, NY (US); Robert Gregory Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/587,413

(22) Filed: Sep. 30, 2019

(51) Int. Cl.
    *H02J 3/38* (2006.01)
    *H02J 3/46* (2006.01)

(52) U.S. Cl.
    CPC .............. *H02J 3/386* (2013.01); *H02J 3/46* (2013.01)

(58) Field of Classification Search
    CPC ............. H02J 3/386; H02J 3/38; H02J 3/46
    See application file for complete search history.

(56) References Cited

U.S. PATENT DOCUMENTS

| | | | |
|---|---|---|---|
| 7,446,435 B2 | 11/2008 | Zhang et al. |
| 8,049,352 B2 | 11/2011 | Jorgensen et al. |
| 8,600,572 B2 | 12/2013 | Sri-Jayantha |
| 9,046,235 B2 | 6/2015 | Wilson |
| 9,048,039 B2 | 6/2015 | Crane et al. |
| 9,134,353 B2 | 9/2015 | Jia et al. |
| 9,274,250 B2 | 3/2016 | Pasken et al. |
| 9,279,715 B2 | 3/2016 | Hedin |
| 9,285,504 B2 | 3/2016 | Dannevik et al. |
| 9,377,009 B2 | 6/2016 | Moeller et al. |
| 9,537,371 B2 | 1/2017 | Appa |
| 9,803,623 B2 | 10/2017 | Burkle |
| 1,002,724 A1 | 7/2018 | Wagoner et al. |

(Continued)

FOREIGN PATENT DOCUMENTS

| | | |
|---|---|---|
| EP | 2341594 A1 | 7/2011 |
| EP | 2227856 B1 | 4/2012 |

(Continued)

OTHER PUBLICATIONS

Li et al., Method for Wind Farm Cluster Active Power Optimal Dispatch Under Restricted Output Condition, 2015 5th International Conference on Electric Utility Deregulation and Restructuring and Power Technologies (DRPT), IEEE Xplore, China Mar. 14, 2016.

(Continued)

*Primary Examiner* — Robert L Deberadinis
(74) *Attorney, Agent, or Firm* — Dority & Manning, P.A.

(57) ABSTRACT

An electrical power system connectable to a power grid includes at least one cluster of electrical power subsystems. Each of the electrical power subsystems includes a power converter electrically coupled to a generator having a generator rotor and a generator stator. Each of the electrical power subsystems defines a stator power path and a converter power path for providing power to the power grid. The electrical power system also includes a single cluster transformer connecting the at least one cluster of the electrical power subsystems to the power grid. The single cluster transformer includes a plurality of low-voltage (LV) primary windings and at least one medium-voltage/high-voltage secondary (MV/HV) winding.

20 Claims, 12 Drawing Sheets

(56) References Cited

U.S. PATENT DOCUMENTS

| | | |
|---|---|---|
| 2002/0029097 A1 | 3/2002 | Pionzio, Jr. et al. |
| 2008/0197962 A1 | 8/2008 | Steenkamp et al. |
| 2010/0217550 A1 | 8/2010 | Crabtree et al. |
| 2010/0217642 A1 | 8/2010 | Crubtree et al. |
| 2010/0218108 A1 | 8/2010 | Crabtree et al. |
| 2010/0308585 A1 | 12/2010 | Jorgensen et al. |
| 2010/0332373 A1 | 12/2010 | Crabtree et al. |
| 2011/0040666 A1 | 2/2011 | Crabtree et al. |
| 2011/0307109 A1 | 12/2011 | Sri-Jayantha |
| 2012/0175962 A1 | 7/2012 | Zhan et al. |
| 2012/0296582 A1 | 11/2012 | Hedin |
| 2012/0303278 A1 | 11/2012 | Dannevik et al. |
| 2013/0201316 A1 | 8/2013 | Binder et al. |
| 2013/0301180 A1 | 11/2013 | Crane et al. |
| 2014/0142872 A1 | 5/2014 | Hedin |
| 2014/0324351 A1 | 10/2014 | Dannevik et al. |
| 2015/0043200 A1 | 2/2015 | Wilson |
| 2015/0094968 A1 | 4/2015 | Jia et al. |
| 2015/0108952 A1 | 4/2015 | Moeller et al. |
| 2016/0045841 A1 | 2/2016 | Kaplan et al. |
| 2016/0072287 A1 | 3/2016 | Jia et al. |
| 2016/0172934 A1 | 6/2016 | Appa |
| 2016/0276829 A1 | 9/2016 | Haederli et al. |
| 2016/0290854 A1 | 10/2016 | Hedin |
| 2017/0027168 A1 | 2/2017 | Heath |
| 2017/0078400 A1 | 3/2017 | Binder et al. |
| 2017/0175711 A1 | 6/2017 | Burkle |
| 2017/0250568 A1 | 8/2017 | Gross et al. |
| 2017/0331899 A1 | 11/2017 | Binder et al. |
| 2018/0034912 A1 | 2/2018 | Binder et al. |
| 2018/0067003 A1 | 3/2018 | Michiwaki |
| 2018/0294650 A1 | 10/2018 | Shukla et al. |
| 2018/0323620 A1 | 11/2018 | Ganireddy et al. |

FOREIGN PATENT DOCUMENTS

| | | |
|---|---|---|
| EP | 2662878 A1 | 11/2013 |
| EP | 2863511 A1 | 4/2015 |
| EP | 2996237 A1 | 3/2016 |
| EP | 3279628 A1 | 2/2018 |
| WO | WO0177525 A1 | 10/2001 |
| WO | WO2009/083445 A1 | 7/2009 |
| WO | WO2011/087440 A1 | 7/2011 |
| WO | WO2011/161692 A2 | 12/2011 |
| WO | WO2013/009258 A1 | 1/2013 |
| WO | WO2013/167482 A1 | 11/2013 |
| WO | WO2013/181463 A1 | 12/2013 |
| WO | WO2014/153570 A9 | 9/2014 |
| WO | WO2015/013249 A2 | 1/2015 |
| WO | WO2016/011454 A1 | 1/2016 |

OTHER PUBLICATIONS

Pierik et al., A Wind Farm Electrical Systems Evaluation with EeFarm—II, Energies, vol. 3, pp. 619-633.

Damen et al., Steady State Electrical Design, Power Performance and Economic Modeling of Offshore Wind Farms, EPE Journal, vol. 16, Issue 4, Sep. 22, 2015, pp. 44-49. (Abstract Only).

ELECTRICAL POWER SYSTEMS HAVING A CLUSTER TRANSFORMER WITH MULTIPLE PRIMARY WINDINGS

FIELD

The present disclosure relates generally to electrical power systems and subsystems, and more particularly to electrical power systems having a cluster transformer with multiple primary windings.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

As shown in FIG. 2, the illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

Electrical balance of plant (BoP) necessitates a pad mount transformer (such as the main transformer 4) for each wind turbine 10 so as to step up the voltage at turbine level and evacuate turbine power using a megavolt (MV) electrical solution. The requirement of the main transformer for each wind turbine power system, however, adds to the complexity and cost of the wind farm 46. Thus, it would be advantageous to eliminate such transformers from wind turbine power systems.

BRIEF DESCRIPTION

Aspects and advantages of the invention will be set forth in part in the following description, or may be obvious from the description, or may be learned through practice of the invention.

In one aspect, the present disclosure is directed to an electrical power system connectable to a power grid. The electrical power system includes at least one cluster of electrical power subsystems. Each of the electrical power subsystems includes a power converter electrically coupled to a generator having a generator rotor and a generator stator. Each of the electrical power subsystems defines a stator power path and a converter power path for providing power to the power grid. The electrical power system also includes a single cluster transformer connecting the at least one cluster of the electrical power subsystems to the power grid. The single cluster transformer includes a plurality of low-voltage (LV) primary windings and at least one medium-voltage/high-voltage secondary (MV/HV) winding.

In one embodiment, each of the converter power paths of each of the electrical power subsystems may include a partial power transformer. In alternative embodiments, each of the electrical power subsystems may be absent of any additional transformers.

In another embodiment, the single cluster transformer may include at least three LV primary windings.

In further embodiments, the electrical power system may include a plurality of clusters of the electrical power subsystems. In such embodiments, the electrical power system may include a step-up transformer connecting the plurality of clusters of the electrical power subsystems to the power grid.

In additional embodiments, the electrical power subsystems may be least one of wind turbine power systems, solar power systems, energy storage power systems, or combinations thereof. For example, in one embodiment, the electrical power subsystems may include one or more of the wind turbine power systems and at least one additional direct current (DC) power generating source (such one or more solar power systems, one or more energy storage power systems, or combinations thereof).

In another embodiment, the generator may include a doubly-fed induction generator (DFIG), a permanent magnet synchronous generator (PMG), or any other suitable type of generator.

In another aspect, the present disclosure is directed to a method of installing an electrical power system at a site and connecting the electrical power system to a power grid to provide a target electrical balance of plant (BoP). The method includes arranging at least one cluster of electrical power subsystems in a common geographically area. Each of the electrical power subsystems includes a power converter electrically coupled to a generator having a generator rotor and a generator stator. Each of the electrical power subsystems defines a stator power path and a converter power path for providing power to the power grid. The method also includes connecting the at least one cluster of the electrical power subsystems to the power grid via a single cluster transformer. The single cluster transformer includes a plurality of low-voltage (LV) primary windings and at least one medium- voltage/high-voltage secondary (MV/HV) winding. It should be understood that the method may further include any of the additional steps and/or features described herein.

In yet another aspect, the present disclosure is directed to an electrical power system connectable to a power grid. The electrical power system includes at least one electrical power subsystem having a power converter electrically coupled to a generator having a generator rotor and a generator stator. Each of the electrical power subsystems defines a stator power path and a converter power path for providing power to the power grid. The electrical power system also includes at least one additional direct current (DC) power generating source and a single cluster transformer connecting the at least one electrical power subsystem and the additional DC power generating source(s) to the power grid. Further, the single cluster transformer includes a plurality of low-voltage (LV) primary windings and at least one medium-voltage/high-voltage secondary (MV/HV) winding. It should be understood that the electrical power system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
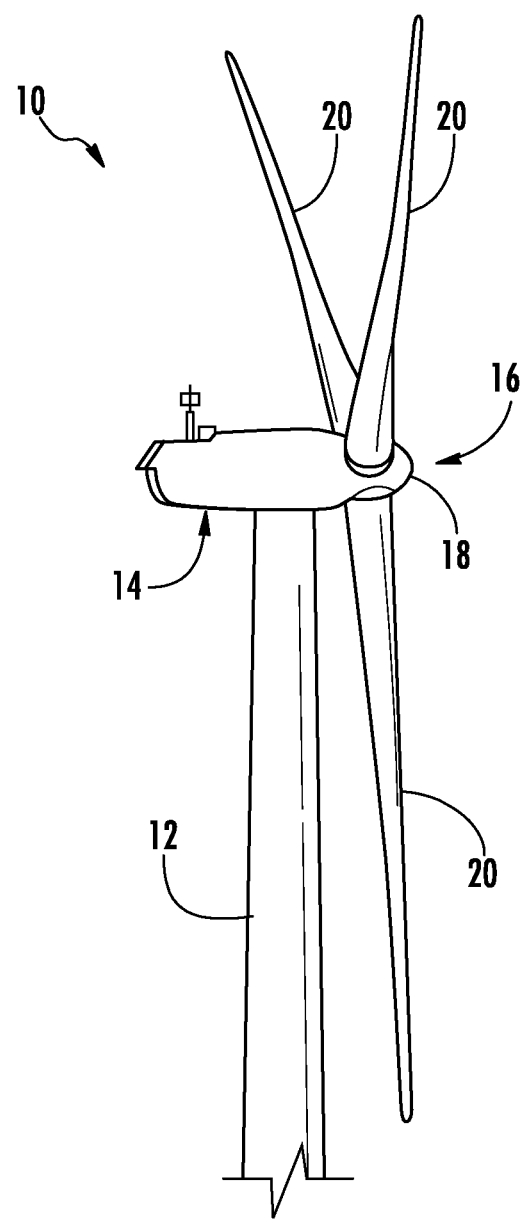
FIG. 1 illustrates a perspective view of a portion of one embodiment of a wind turbine according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an electrical power system having at least one cluster of electrical power subsystems connected to the power grid via a cluster transformer with multiple primary windings and a single secondary winding so as to step up the voltage supplied to the grid without requiring a separate transformer for each subsystem.

Figure 2:
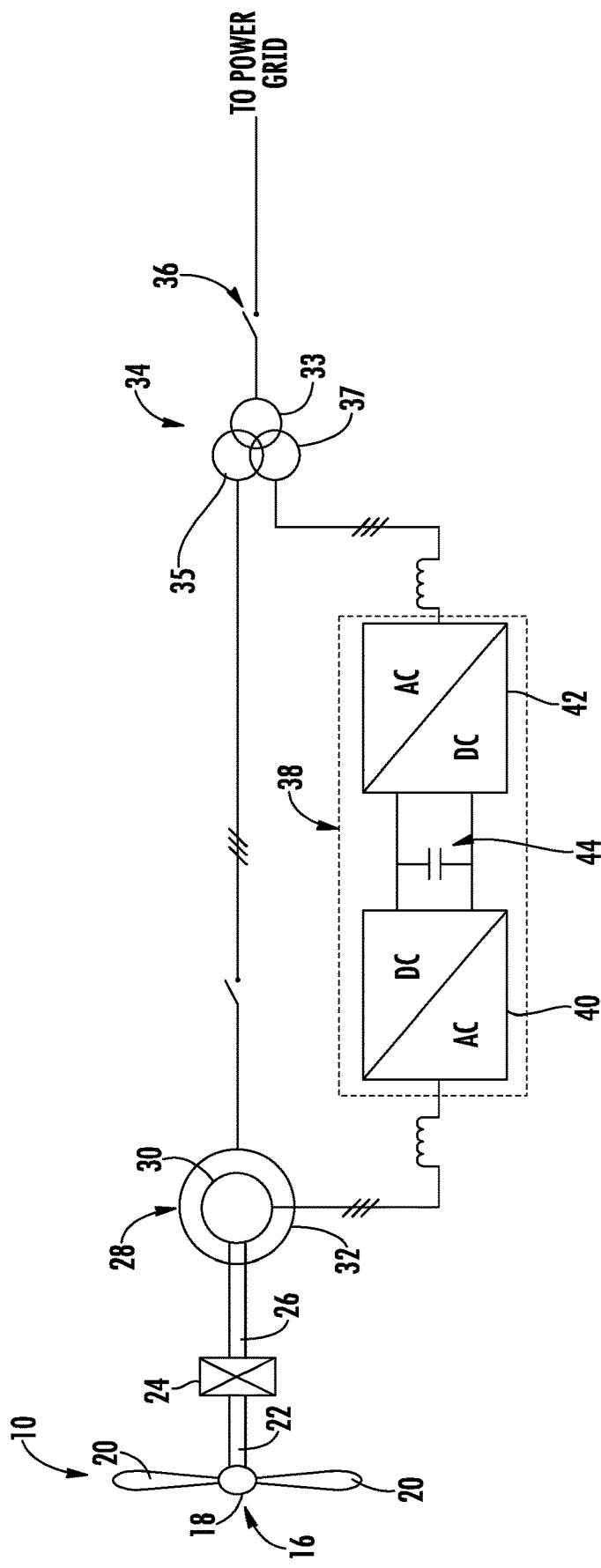
FIG. 2 illustrates a schematic diagram of a conventional electrical power system with a DFIG suitable for use with the wind turbine shown in FIG. 1.
Figure 3:
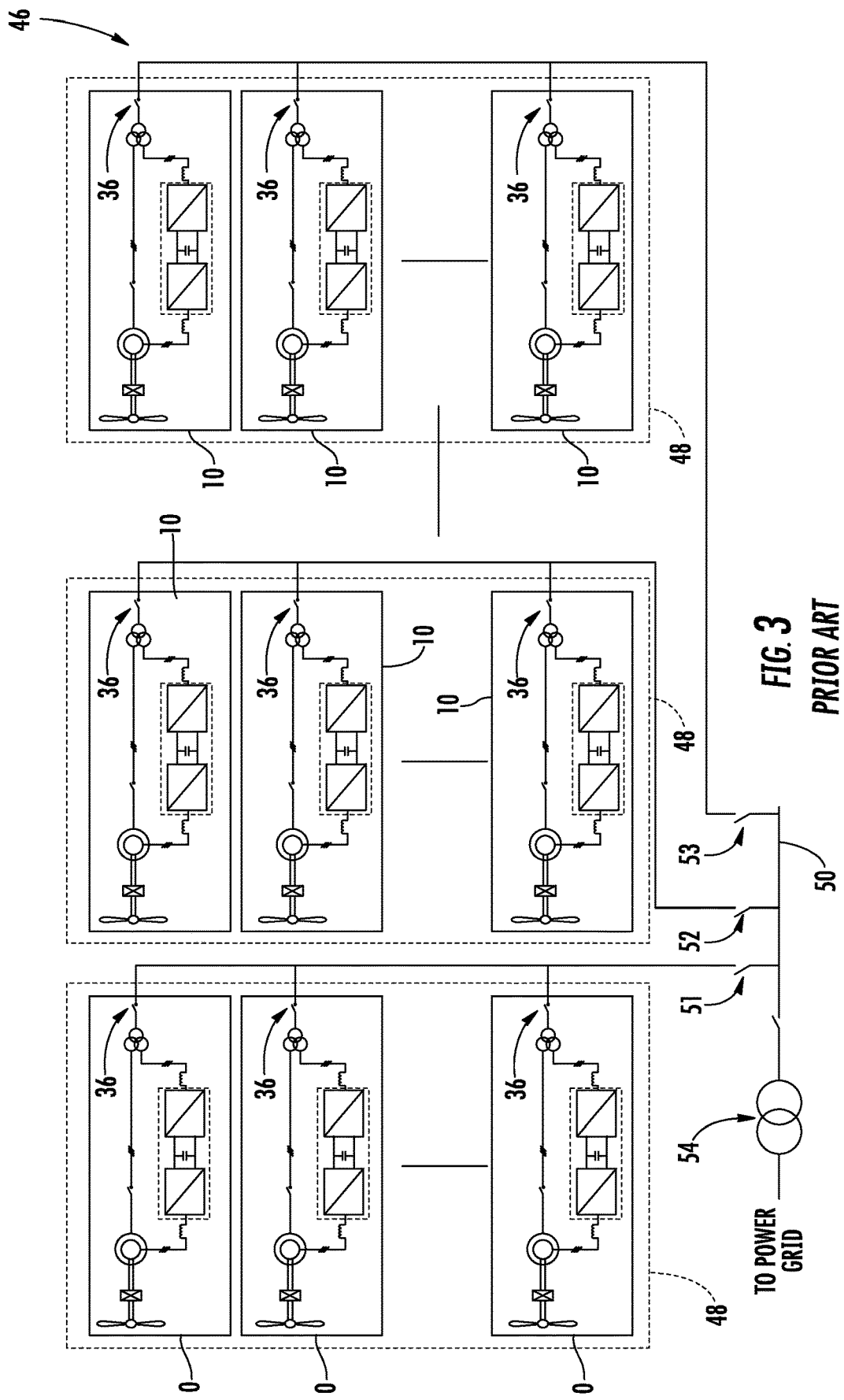
FIG. 3 illustrates a schematic diagram of one embodiment of a conventional wind farm according to conventional construction, particularly illustrating a plurality of wind turbine power systems such as those illustrated in FIG. 2 connected to the power grid via a single sub-station transformer.
Figure 4:
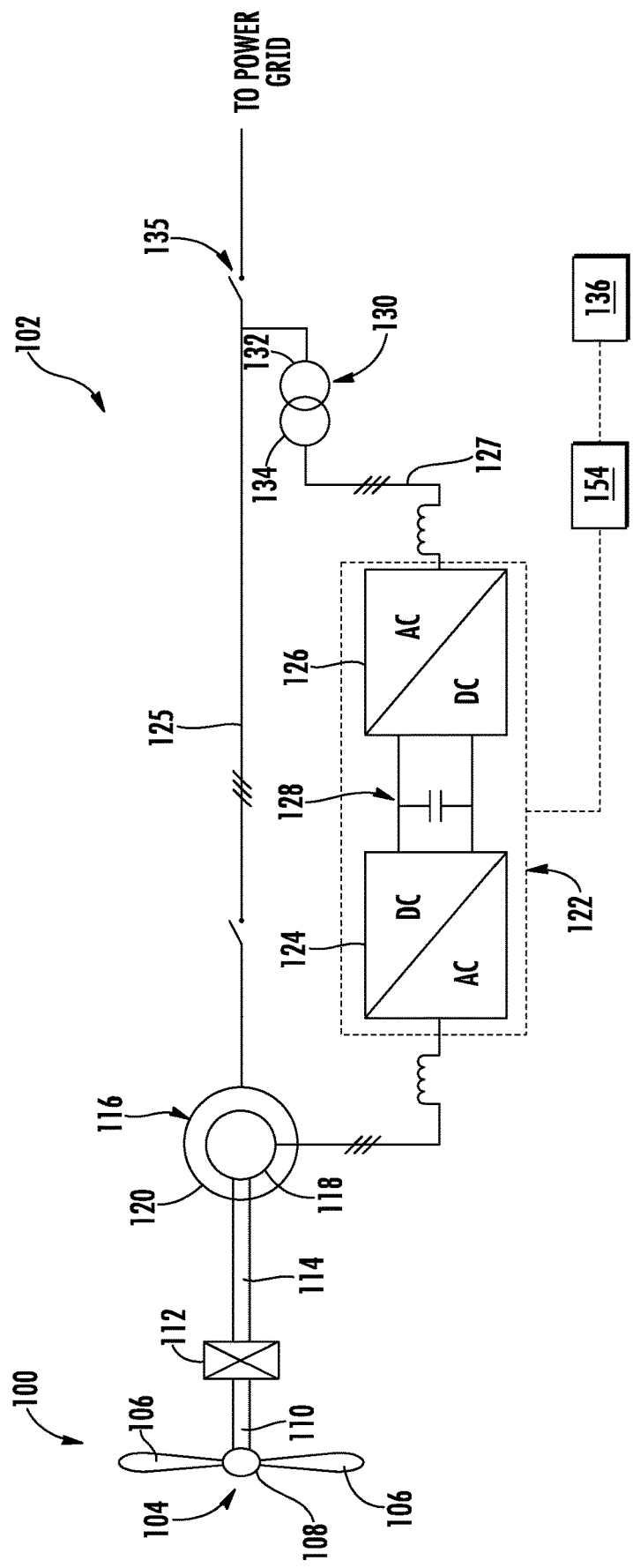
FIG. 4 illustrates a schematic diagram of one embodiment of an electrical power system for a wind turbine according to the present disclosure.

Referring now to FIG. 4, a schematic diagram of one embodiment of an electrical power subsystem 102 according to the present disclosure is illustrated. It should be understood that the term "subsystem" is used herein to distinguish between the individual power systems (e.g. as shown in FIG. 4 or FIG. 2) and the overall electrical power system 105 of FIG. 5 or FIG. 3 that includes a plurality of electrical power subsystems 102. Those of ordinary skill in the art, however, will recognize that the electrical power subsystem 102 of FIG. 4 (or FIG. 2) may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a generator 116 (such as a doubly-fed induction generator (DFIG) or a permanent magnet synchronous generator (PMG)) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively.

For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 4 does not include the conventional three-winding main transformer described above. Rather, as shown in the illustrated embodiment, the partial power transformer 130 may correspond to a two-winding transformer having a primary winding 132 connected to the power grid and a secondary winding 134 connected to the line side converter 126.

Notably, the partial power transformer may in some embodiments include a third auxiliary winding for auxiliary loads.

In addition, the electrical power subsystem 102 may include a controller 136 configured to control any of the components of the wind turbine 100 and/or implement the method steps as described herein. For example, as shown particularly in FIG. 13, the controller 136 may include one or more processor(s) 138 and associated memory device(s) 140 configured to perform a variety of computer-implemented functions (e.g., performing the methods, steps, calculations and the like and storing relevant data as disclosed herein). Additionally, the controller 136 may also include a communications module 142 to facilitate communications between the controller 136 and the various components of the wind turbine 100, e.g. any of the components of FIG. 4. Further, the communications module 142 may include a sensor interface 144 (e.g., one or more analog-to-digital converters) to permit signals transmitted from one or more sensors 139, 141, 143 to be converted into signals that can be understood and processed by the processors 138.

Figure 13:
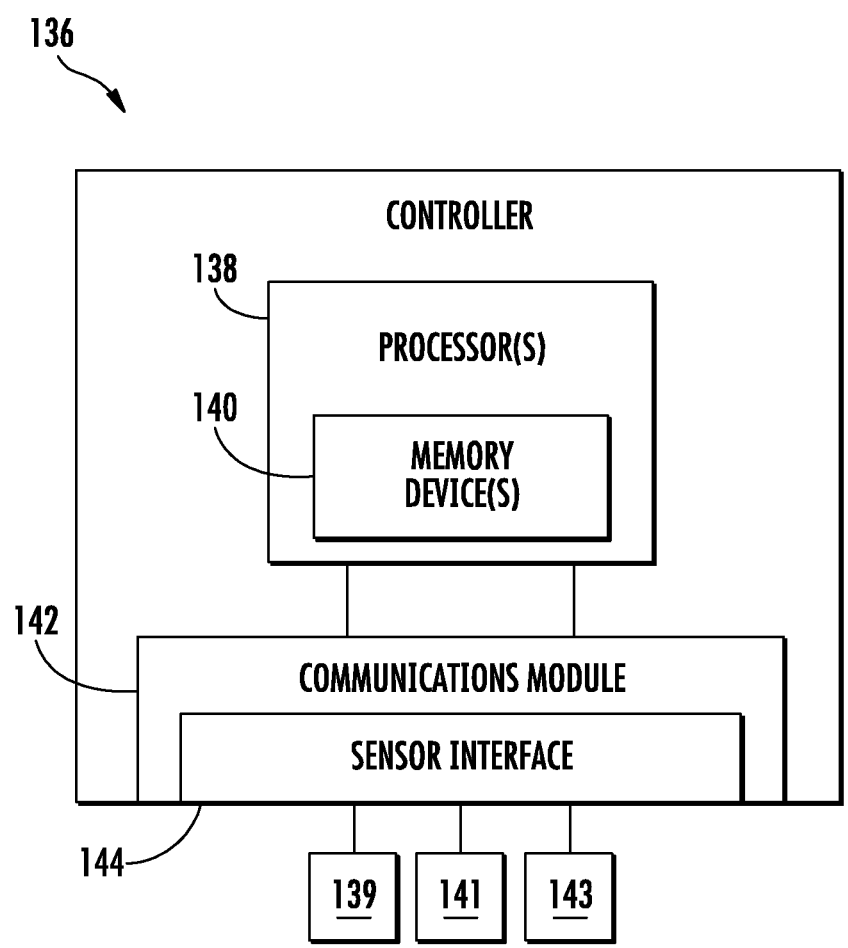
FIG. 13 illustrates a block diagram of one embodiment of a controller that can be used to control the electrical power system according to the present disclosure.

It should be appreciated that the sensors 139, 141, 143 may be communicatively coupled to the communications module 142 using any suitable means. For example, as shown in FIG. 13, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller 136 to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 128. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the grid. It should be understood that the rotor side converter 124 and the line side converter 126 may have any configuration using any switching devices that facilitate operation of electrical power system as described herein.

Further, the power converter 122 may be coupled in electronic data communication with the turbine controller 136 and/or a separate or integral converter controller 154 to control the operation of the rotor side converter 124 and the line side converter 126. For example, during operation, the controller 136 may be configured to receive one or more voltage and/or electric current measurement signals from the first set of voltage and electric current sensors 139, 141, 143. Thus, the controller 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Figure 5:
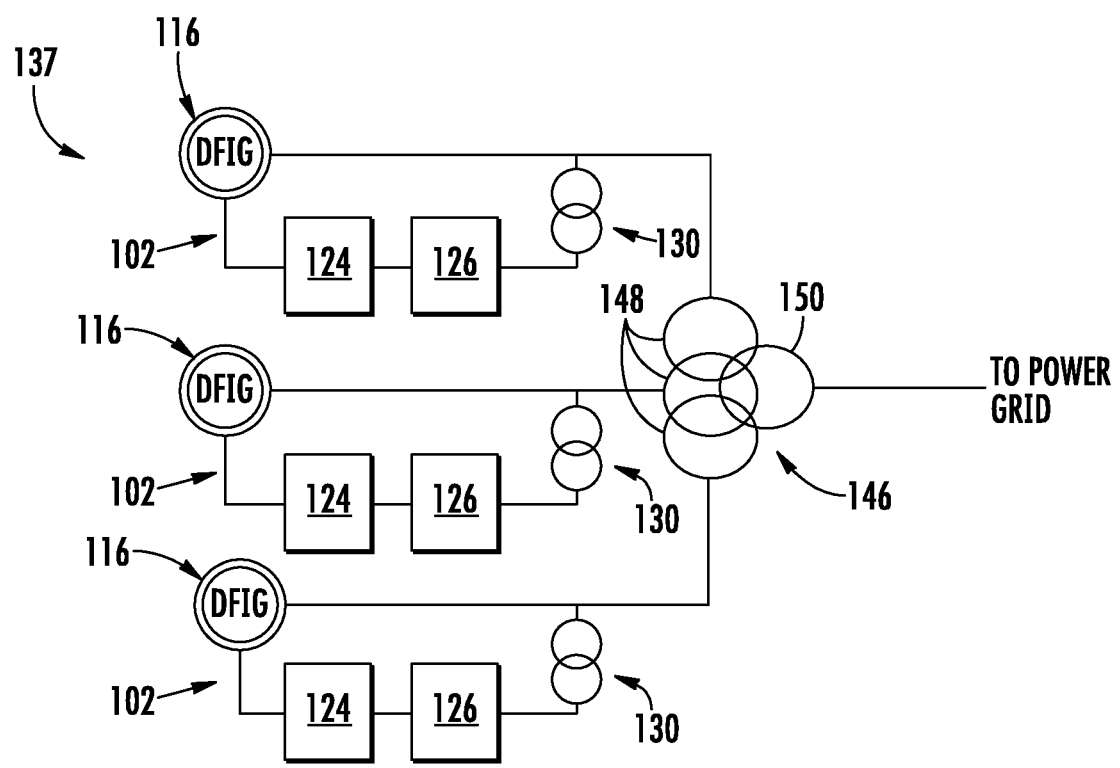
FIG. 5 illustrates a schematic diagram of one embodiment of a cluster of electrical power subsystems according to the present disclosure, particularly illustrating the cluster connected to the power grid via a single cluster transformer.
Figure 6:
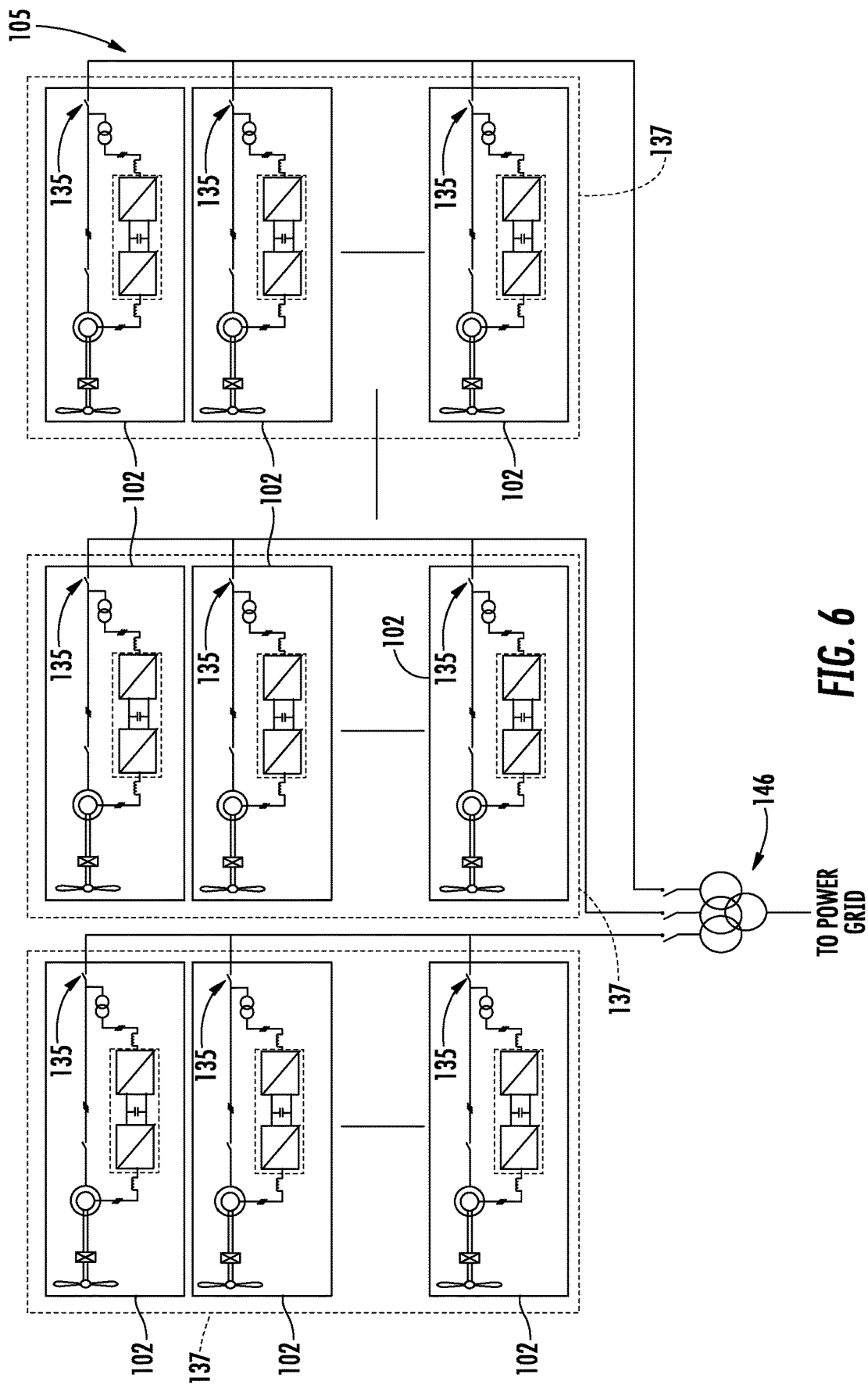
FIG. 6 illustrates a schematic diagram of one embodiment of a plurality of clusters of electrical power subsystems according to the present disclosure, particularly illustrating the plurality of clusters connected to the power grid via a single cluster transformer.
Figure 7:
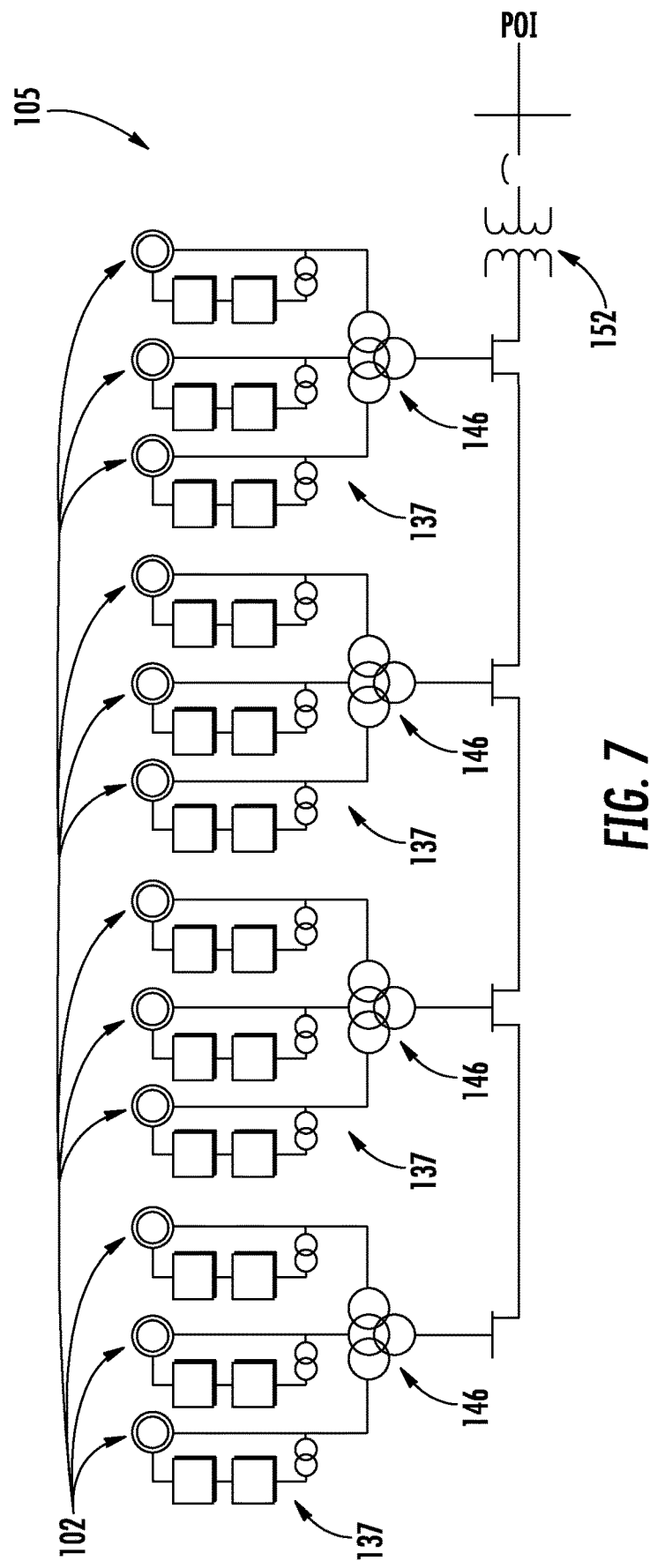
FIG. 7 illustrates a schematic diagram of one embodiment of a plurality of clusters of electrical power subsystems according to the present disclosure, particularly illustrating each of clusters connected to the power grid via a single cluster transformer.

Referring particularly to FIGS. 5-7, individual power systems (such as the power subsystem 102 illustrated in FIG. 4) may be arranged in one or more clusters 137 to form an electrical power system 105. More specifically, as shown, the wind turbine power systems 100 may be arranged into a plurality of clusters 137 in a common geographically area so as to form a wind farm.

In addition, as shown, the electrical power system 105 may also include a single cluster transformer 146 connecting all of the cluster(s) 137 to the power grid. Thus, the single cluster transformer 146 is configured to provide a target electrical balance of plant (BoP) of the electrical power system 105. In addition, the single cluster transformer 146 is configured to step up the voltage amplitude of the electrical power from the clusters 137 such that the transformed electrical power may be further transmitted to the power grid.

In one embodiment, the location of the single cluster transformer 146 may be determined based on one or more site-related conditions of the electrical power system 105. For example, in certain embodiments, the one or more site-related conditions of the electrical power system 105 may include a distance between one or more of the electrical power subsystems 102, locations of the electrical power subsystems 102, topology of the site of the electrical power system 105, and/or type of one or more of the electrical power subsystems 102.

Further, as shown, the single cluster transformer 146 may include a plurality of low-voltage (LV) primary windings 148 and at least one medium-voltage/high-voltage secondary (MV/HV) winding 150. More specifically as shown generally in FIGS. 5-12, the single cluster transformer 146 may include at least three LV primary windings 148. In further embodiments, the single cluster transformer 146 may include more than three LV primary windings 148 or less than three LV primary windings 148. In addition, as shown in FIGS. 5-9, the single cluster transformer 146 may include a single MV/HV winding 150. In alternative embodiments, the single cluster transformer 146 may include a plurality of MV/HV windings 150

In another embodiment, as shown particularly in FIG. 7, the electrical power system 105 may also include a step-up transformer 152 connecting the plurality of clusters 137 of the electrical power subsystems 102 to the power grid.

Figure 8:
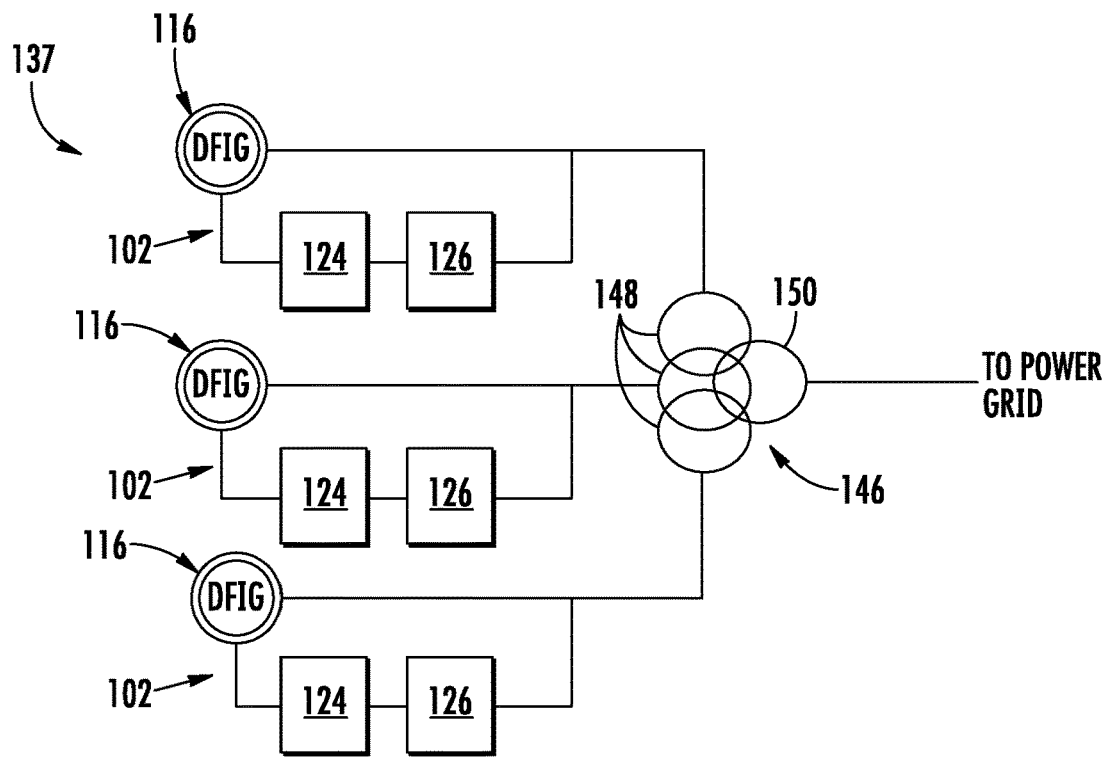
FIG. 8 illustrates a schematic diagram of another embodiment of a cluster of electrical power subsystems according to the present disclosure, particularly illustrating the cluster connected to the power grid via a single cluster transformer.

Referring now to FIG. 8, in alternative embodiments, each of the electrical power subsystems 102 may be absent of any additional transformers. In such embodiments, as shown, the single cluster transformer 146 connects all of the cluster(s) 137 to the power grid and minimizes duplicity of transformers across the wind farm and associated auxiliaries.

Figure 9:
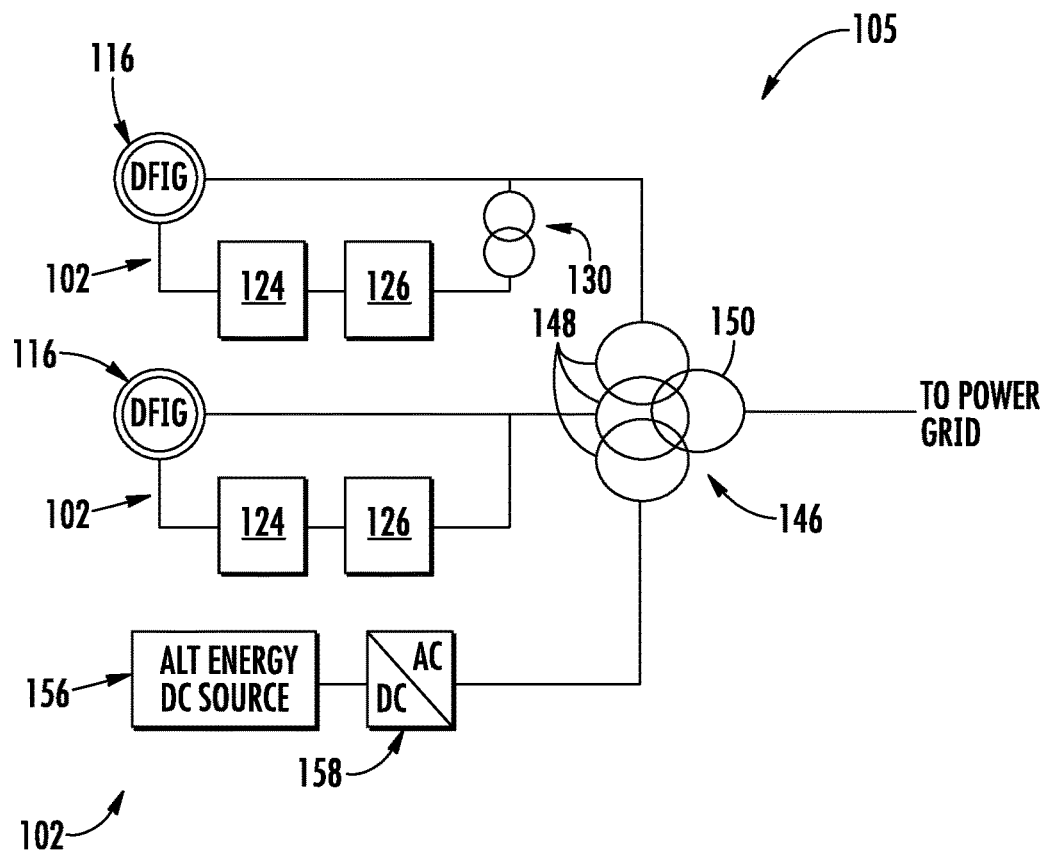
FIG. 9 illustrates a schematic diagram of yet another embodiment of a cluster of different electrical power subsystems according to the present disclosure, particularly illustrating the cluster connected to the power grid via a single cluster transformer.

Referring now to FIG. 9, a schematic diagram of another embodiment of the electrical power system 105 of the present disclosure is illustrated. As shown, the electrical power system 105 includes a combination of energy sources with varying voltage levels. More specifically, the electrical power system 105 may include a DFIG power system 102 having a partial transformer 130 as described herein, a DFIG power system 102 without a transformer as described herein, and an alternative or additional direct current (DC) energy source 156. In addition, as shown, the cluster 137 of energy sources may be connected to the power grid via the single cluster transformer 146 described herein. Further, as shown, the alternative or additional direct current (DC) energy source 156 may be connected to the cluster transformer 146 via an inverter 158 for converting the direct current to alternating current.

Figure 10:
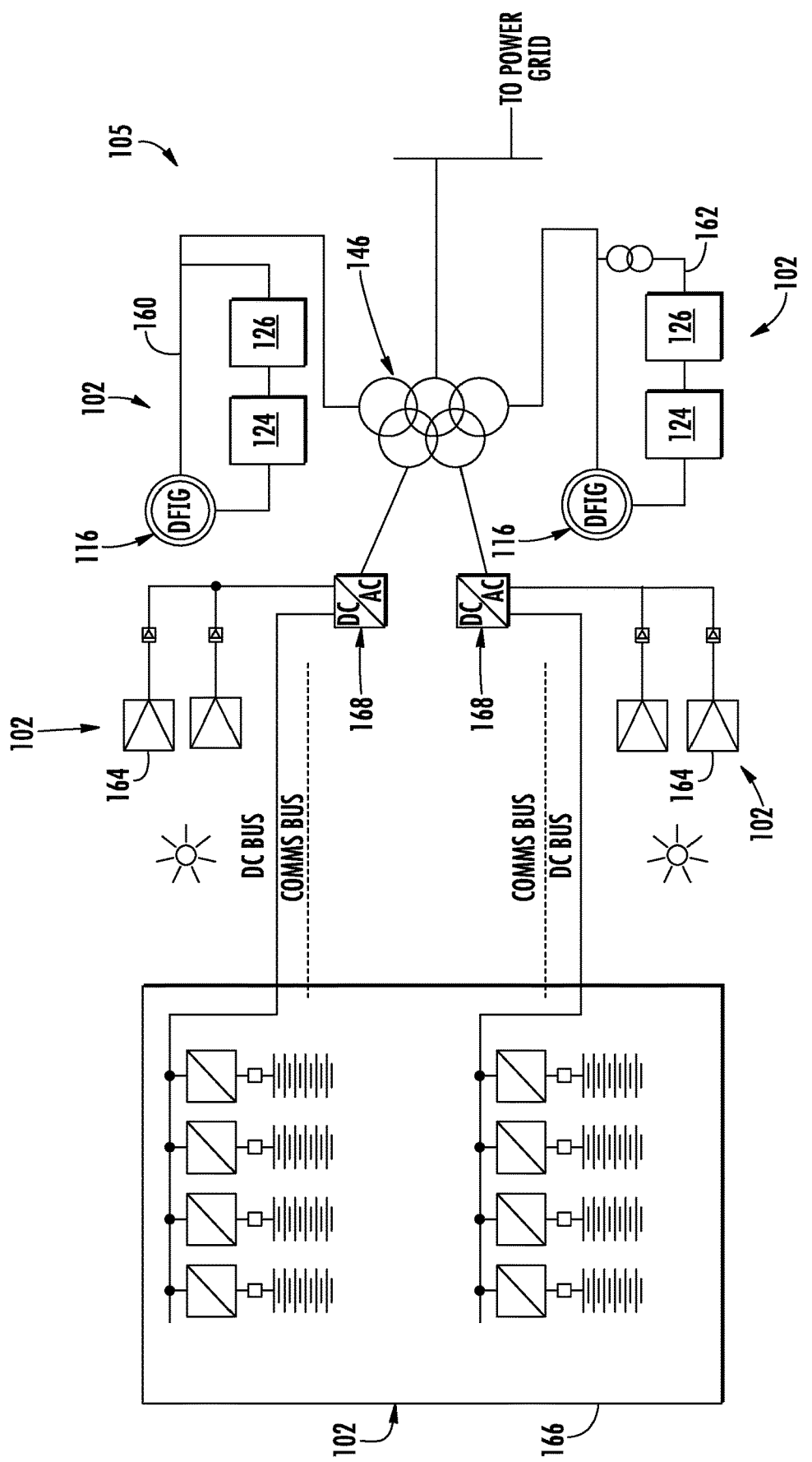
FIG. 10 illustrates a schematic diagram of one embodiment of a cluster of different electrical power subsystems according to the present disclosure, particularly illustrating the cluster connected to the power grid via a single cluster transformer.
Figure 11:
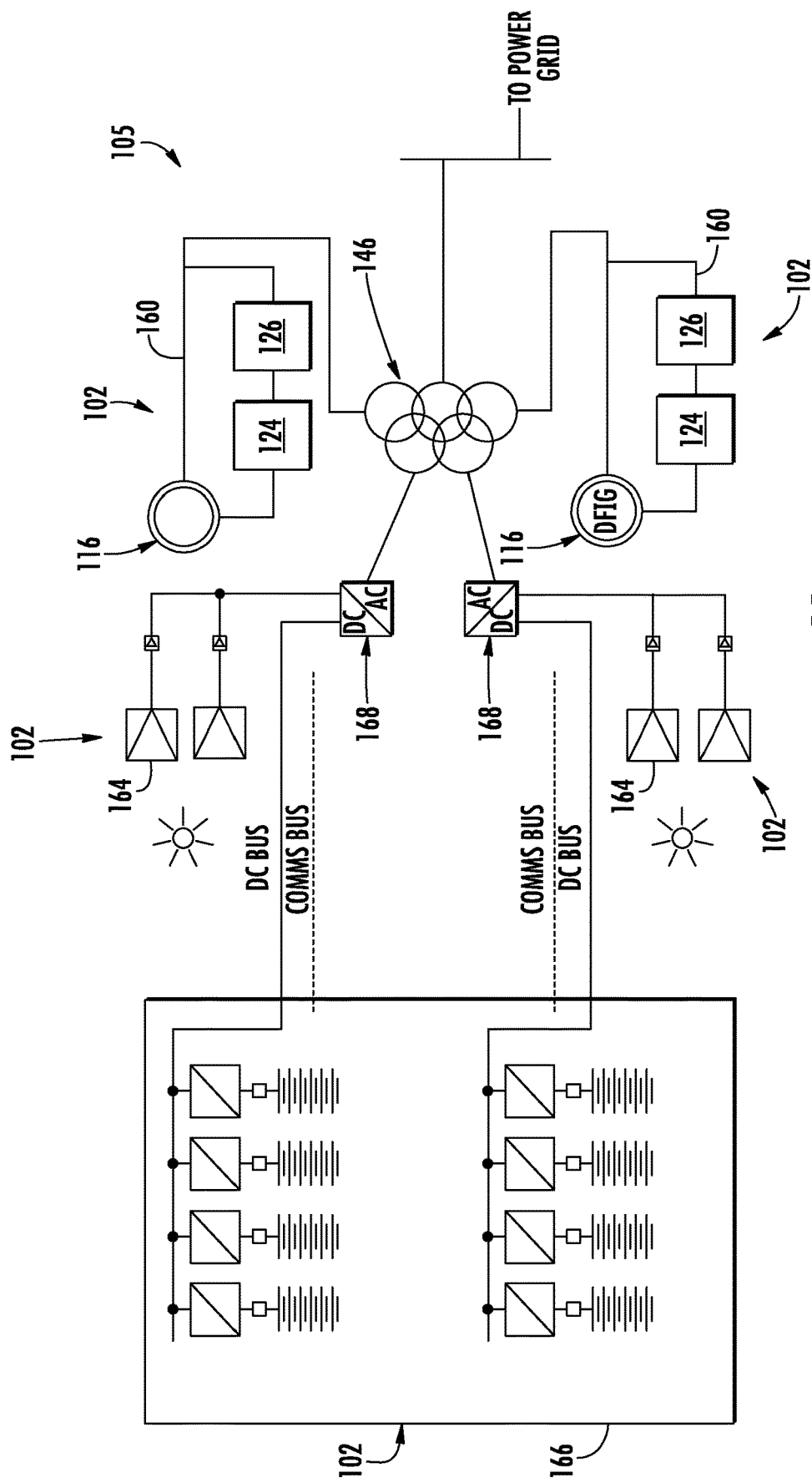
FIG. 11 illustrates a schematic diagram of another embodiment of a cluster of different electrical power subsystems according to the present disclosure, particularly illustrating the cluster connected to the power grid via a single cluster transformer.
Figure 12:
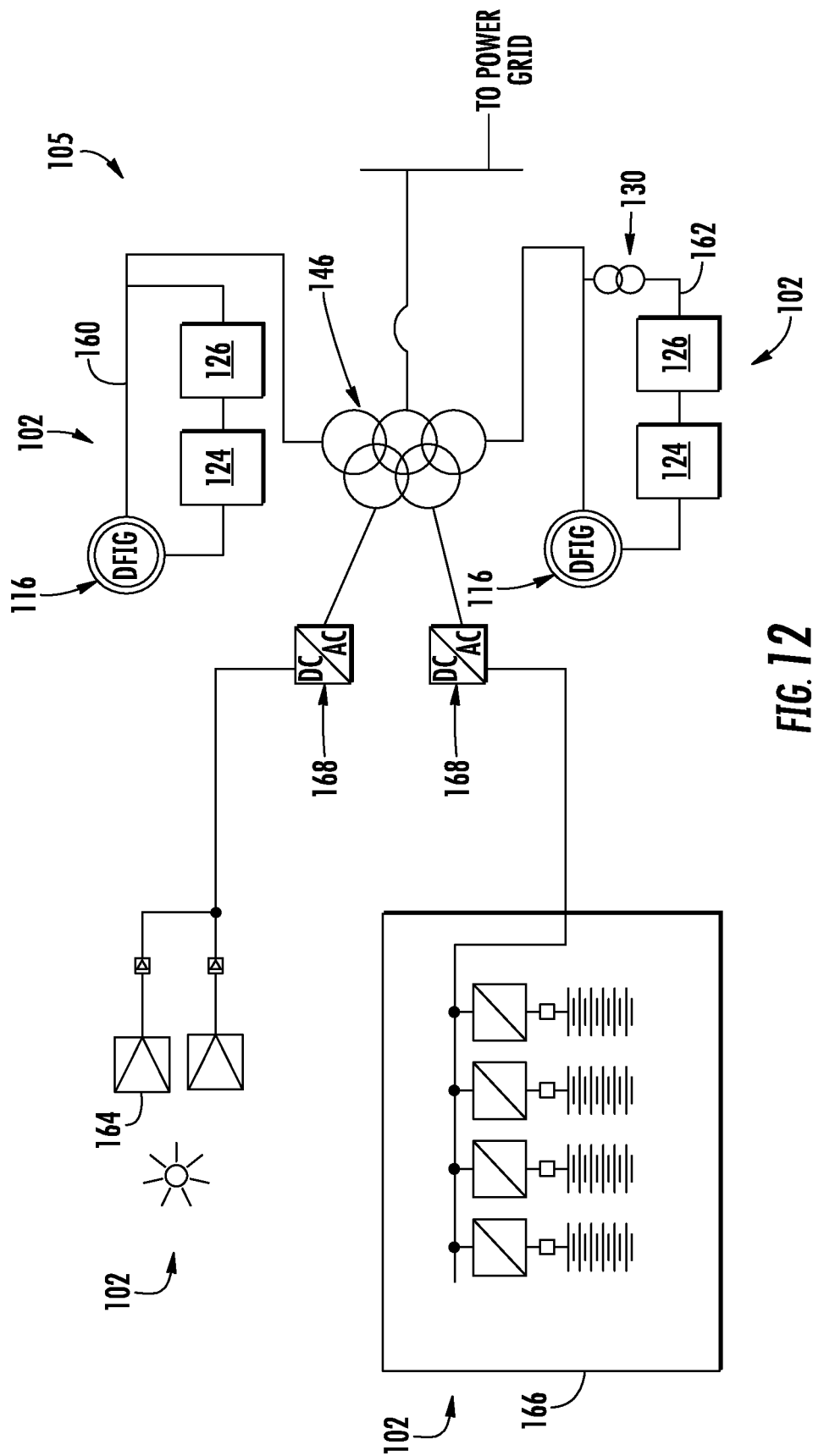
FIG. 12 illustrates a schematic diagram of yet another embodiment of a cluster of different electrical power subsystems according to the present disclosure, particularly illustrating the cluster connected to the power grid via a single cluster transformer.

Referring now to FIGS. 10-12, the electrical power system 105 may include any combination of the electrical power subsystems 102 connected to the power grid via the single cluster transformer 146 having multiple primary windings. For example, as shown in FIG. 10, the electrical power system 105 may include a combination of wind turbine power systems 160, 162 (e.g. one 162 with the partial transformer 130 and one without 160), one or more solar power systems 164, and/or one or more energy storage power systems 166. More specifically, as shown, the electrical power system 105 includes a plurality of solar power systems 164 and a plurality of energy storage power systems 166, with one of each of the systems connected to an inverter 168 that is connected to the single cluster transformer 146.

In another embodiment, as shown in FIG. 11, the electrical power system 105 may include a combination of wind turbine power systems 160 (e.g. both without an additional transformer), one or more solar power systems 164, and/or one or more energy storage power systems 166. More specifically, as shown, the electrical power system 105 includes a plurality of solar power systems 164 and a plurality of energy storage power systems 166, with one of each of the systems connected to an inverter 168 that is connected to the single cluster transformer 146.

In yet another embodiment, as shown in FIG. 12, the electrical power system 105 may include a combination of wind turbine power systems 160, 162 (e.g. one 162 with the partial transformer 130 and one without 160), one or more solar power systems 164, and/or one or more energy storage power systems 166. More specifically, as shown, the electrical power system 105 may include one solar power system 164 and one energy storage power system 166, with one of each of the systems separately connected to separate inverter 168 that is connected to the single cluster transformer 146.

The present disclosure is further directed to methods for operating electrical power subsystems 102 as discussed herein. Such methods may, for example, be performed by a controller 154. A method may include, for example, the step of switching the plurality of rotor-side converters 124 to produce an interleaved switching pattern between the plurality of rotor-side converters 124.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical power system connectable to a power grid, the electrical power system comprising:
   at least one cluster of electrical power subsystems, each of the electrical power subsystems comprising a power converter electrically coupled to a generator having a generator rotor and a generator stator, each of the electrical power subsystems defining a stator power path and a converter power path for providing power to the power grid; and
   a single cluster transformer connecting the at least one cluster of the electrical power subsystems to the power grid, the single cluster transformer comprising a plurality of low-voltage (LV) primary windings and at least one medium- voltage/high-voltage secondary (MV/HV) winding.

2. The electrical power system of claim 1, wherein each of the converter power paths of each of the electrical power subsystems further comprises a partial power transformer.

3. The electrical power system of claim 1, wherein each of the electrical power subsystems are absent of any additional transformers.

4. The electrical power system of claim 1, wherein the single cluster transformer comprises at least three LV primary windings.

5. The electrical power system of claim 1, further comprising a plurality of clusters of the electrical power subsystems.

6. The electrical power system of claim 5, further comprising a step-up transformer connecting the plurality of clusters of the electrical power subsystems to the power grid.

7. The electrical power system of claim 1, wherein the electrical power subsystems comprise at least one of wind turbine power systems, solar power systems, energy storage power systems, or combinations thereof.

8. The electrical power system of claim 1, wherein the electrical power subsystems comprise one or more of the wind turbine power systems and at least one additional direct current (DC) power generating source.

9. The electrical power system of claim 1, wherein the generator comprises at least one of a doubly-fed induction generator (DFIG) or a permanent magnet synchronous generator (PMG).

10. A method of installing an electrical power system at a site and connecting the electrical power system to a power grid to provide a target electrical balance of plant (BoP), the method comprising:
    arranging at least one cluster of electrical power subsystems in a common geographically area, each of the electrical power subsystems comprising a power converter electrically coupled to a generator having a generator rotor and a generator stator, each of the electrical power subsystems defining a stator power path and a converter power path for providing power to the power grid; and
    connecting the at least one cluster of the electrical power subsystems to the power grid via a single cluster transformer, the single cluster transformer comprising a plurality of low-voltage (LV) primary windings and at least one medium-voltage/high-voltage secondary (MV/HV) winding.

11. The method of claim 10, further comprising determining a location of the single cluster transformer based on one or more site-related conditions of the electrical power system.

12. The method of claim 11, wherein the one or more site-related conditions of the electrical power system further comprise at least one of a distance between one or more of the electrical power subsystems, locations of the electrical power subsystems, topology of the site of the electrical power system, and/or type of one or more of the electrical power subsystems.

13. The method of claim 10, further comprising a partial power transformer in each of the converter power paths of each of the electrical power subsystems.

14. The method of claim 10, wherein each of the electrical power subsystems are absent of any additional transformers.

15. The method of claim 10, wherein the single cluster transformer comprises at least three LV primary windings.

16. The method of claim 10, further comprising providing a plurality of clusters of the electrical power subsystems.

17. The method of claim 16, further comprising connecting the plurality of clusters of the electrical power subsystems to the power grid via a step-up transformer.

18. The method of claim 10, wherein the electrical power subsystems comprise at least one of wind turbine power systems, solar power systems, energy storage power systems, or combinations thereof.

19. The method of claim 10, wherein the electrical power subsystems comprise one or more of the wind turbine power systems and at least one additional direct current (DC) power generating source.

20. An electrical power system connectable to a power grid, the electrical power system comprising:
    at least one electrical power subsystem comprising a power converter electrically coupled to a generator having a generator rotor and a generator stator, each of the electrical power subsystems defining a stator power path and a converter power path for providing power to the power grid;
    at least one additional direct current (DC) power generating source; and
    a single cluster transformer connecting the at least one electrical power subsystem and the at least one additional DC power generating source to the power grid, the single cluster transformer comprising a plurality of low-voltage (LV) primary windings and at least one medium-voltage/high-voltage secondary (MV/HV) winding.

* * * * *